United States Patent Office 2,871,216  
Patented Jan. 27, 1959

2,871,216

NATURAL AND SYNTHETIC RUBBER COMPOSITIONS CONTAINING BORON NITRIDE AND METHOD FOR PRODUCING SAME

Herbert R. Anderson, Jr., Bartlesville, Okla., assignor to Phillips Petroleum Company, a corporation of Delaware No Drawing. Application August 31, 1956  
Serial No. 607,275  
8 Claims. (Cl. 260—41.5)

This invention relates to improved natural and synthetic rubbers employing boron nitride as a reinforcing agent therein and to process for compounding such compositions.

Carbon black, which is the most commonly used reinforcing agent in natural and synthetic rubbers, is frequently replaced by other fillers for applications in which a white or colored rubber stock is desired. When this is done, however, favorable physical properties, such as tensile strength, modulus, abrasion resistance, and elongation, are forfeited.

I have discovered that boron nitride can be employed with surprisingly satisfactory results as a reinforcing agent either alone or in combination with other fillers for natural and synthetic rubber stocks. Since boron nitride is a naturally white pigment, the rubber so produced has many advantages in applications for white or colored rubber products. I have found that boron nitride having an average particle size which is relatively large for reinforcing agents is equivalent to soft carbon blacks in reinforcing characteristics. When employed as a reinforcing agent in synthetic rubber, for example, in cold butadiene-styrene rubber, boron nitride gives a stock which is superior in aged tensile strength and elongation to a similar stock in which a carbon black having similar surface area to the boron nitride is employed.

It is an object of this invention to provide a reinforcing rubber stock which is white or capable of being colored by various pigments. It is also an object of this invention to provide another good reinforcing agent for natural and synthetic rubbers. It is a further object of this invention to provide a method of making these reinforced rubber compositions. Other objects, advantages and features of the present invention will become apparent to those skilled in the art from the following description and examples.

Boron nitride is a dazzling white powder which is soft and unctuous to the touch. It is chemically inert and unaffected by heating to temperatures as high as 500° C. It is a relatively light material, similar in this respect to carbon black. Approximately 62 parts by weight of boron nitride occupies a volume equal to 50 parts by weight of carbon black. While boron nitride has enjoyed a wide use as a pigment in paints, enamels and the like, it has not heretofore been recognized as a possible reinforcing agent in rubber stocks. This is possibly because of relatively unfavorable physical characteristics imparted to rubber stocks by quite similar materials, for example, boron oxide and titanium nitride. A comparison of boron nitride with these materials and various carbon blacks as reinforcing agents is presented in the examples of this specification.

This invention can be advantageously applied to any sulfur vulcanizable elastomers, either natural or synthetic. Ordinarily such synthetic elastomers include homopolymers of conjugated dienes having from 4 to 8 carbon atoms per molecule, copolymers of mixtures of such conjugated dienes, and copolymers having a major amount of conjugated diene and a minor amount of copolymerizable monomer containing the $CH_2=C<$ group. Examples of such synthetic elastomers are butadiene-styrene copolymers, butadiene-methylvinylpyridine copolymer, butadiene-acrylonitrile copolymer, polybutadiene, polyisoprene, polychloroprene and various vulcanizable solid or semisolid isoolefin-conjugated diene copolymers. In a preferred embodiment of this invention a copolymer of butadiene and styrene prepared by emulsion polymerization is compounded with a reinforcing amount of boron nitride.

The amount of boron nitride employed will generally be in the range between 5 and 150 parts by weight per 100 parts of rubber and, in many cases, will be governed by the type product desired. The boron nitride can be used alone as a reinforcing agent or in admixture with carbon black or a mineral pigment such as clay, silica, kaolin, calcium silicate, titanium dioxide, hydrated alumina, calcined magnesia, calcium carbonate, zinc sulfide, zinc oxide or any mixture thereof. Several methods of blending which are known in the art can be employed to incorporate the boron nitride into the rubber stock, for example, the mixing can be effected on a mill along with other compounding ingredients or in an internal mixer, such as a Banbury mixer. Also a latex masterbatching operation is suitable, in which case an aqueous slurry of the boron nitride, with or without other reinforcing agents, is first prepared and then mixed with the latex prior to coagulation.

The products of this invention have many uses in applications where soft carbon black rubbers are now being employed. It is highly suitable where decorative rubbers are desired but has many other applications such as in wire and cable coverings, and the like.

To more fully describe my invention the following examples are presented, which are meant to be exemplary only, and not to limit my invention unduly.

EXAMPLES

Example I

A 75/25 butadiene/styrene rubber prepared by emulsion polymerization at 41° F., having a raw Mooney value (ML-4) of 52 and a bound styrene content of 20 percent, was compounded using as reinforcing agents boron nitride and two different carbon blacks having a surface area similar to the boron nitride. A 75/25 butadiene/styrene rubber prepared by substantially the same process was compounded using boron oxide and titanium nitride as reinforcing agents. The compounding recipes were as follows:

TABLE I

| | Parts by Weight | | | | | |
|---|---|---|---|---|---|---|
| | 1 | 2 | 3 | 4 | 5 | 6 |
| Rubber | 100 | 100 | 100 | 100 | 100 | 100 |
| Boron Nitride | [1] 62.6 | | | | | |
| Thermax [2] | | [1] 50 | | | | |
| P-33 [3] | | | [1] 50 | | | |
| Titanium Nitride | | | | [1] 144 | | |
| Boron Oxide ($B_2O_3$) | | | | | [1] 51.7 | [1] 51.7 |
| Zinc Oxide | 3 | 3 | 3 | 3 | 3 | 3 |
| Stearic Acid | 1 | 1 | 1 | 1 | 1 | 1 |
| Flexamine [4] | 1 | 1 | 1 | 1 | 1 | 1 |
| Sulfur | 1.75 | 1.75 | 1.75 | 1.75 | 1.75 | 2.25 |
| Santocure [5] | 1.13 | 1.1 | 1.1 | 1 | 1 | 1 |

[1] Quantities used are approximately equivalent on a volume basis.  
[2] Medium thermal carbon black.  
[3] Fine thermal carbon black.  
[4] Physical mixture containing 65 percent of a complex diarylamino-ketone reaction product and 35 percent of N, N'-diphenyl-p-phenylene-diamine.  
[5] N-cyclohexyl-2-benzothiazylsulfenamide.

The stocks were compounded using mill mixing. The boron oxide filled stocks (5 and 6) were very sticky and adhered to the rolls during compounding. All stocks were then cured for 30 minutes at 307° F., and the physical properties determined. No cure could be obtained in either of the boron oxide recipes. The properties of the other stocks were as follows:

TABLE II

| | Recipes | | | |
|---|---|---|---|---|
| | Boron Nitride | Thermax | P-33 | Titanium Nitride |
| Unaged Samples: | | | | |
| Compression set, percent | 24.9 | 19.1 | 17.8 | |
| 300% Modulus, pounds per square inch | 500 | 460 | 410 | 250 |
| Tensile, pounds per square inch | 1,860 | 2,410 | 3,350 | 630 |
| Elongation, percent | 750 | 720 | 785 | 750 |
| 200° F. Maximum tensile, pounds per square inch | 250 | 250 | 300 | |
| ΔT° F | 89.4 | 41.9 | 44.6 | |
| Resilience, percent | 53.6 | 71.9 | 69.3 | |
| Shore hardness | 57.5 | 48 | 48 | |
| Abrasion index, Goodyear Angle Abrader | 87 | 82 | 100 | |
| Compounded MS 1½, 212° F | 28.5 | 29.5 | 28.5 | |
| Gehman freeze point, ° C | −47 | −51 | −48 | |
| Surface area of reinforcing agent, m.²/g | 10.9 | 7.5 | 13.7 | |
| Oven Aged 24 Hours at 212° F: | | | | |
| 300% Modulus, pounds per square inch | 775 | 820 | 600 | |
| Tensile, pounds per square inch | 1,430 | 1,120 | 1,160 | |
| Elongation, percent | 530 | 380 | 480 | |
| ΔT° F | 78.0 | 31.1 | 36.5 | |
| Resilience, percent | 58.6 | 78.4 | 75.6 | |

As shown by the above data the boron nitride reinforced rubber stock exhibited tensile strength which compared favorably with the soft carbon black stocks on the unaged samples and even surpassed them on the aged samples. Boron oxide and titanium nitride did not exhibit reinforcing qualities.

*Example II*

The butadiene/styrene rubber described in Example I was compounded with variable quantities of boron nitride as a reinforcing agent. Control runs were made using fine thermal carbon black (P-33). Compounding recipes were as follows:

TABLE III

| | Parts by Weight | | | | |
|---|---|---|---|---|---|
| | 1 | 2 | 3 | 4 | 5 |
| Rubber | 100 | 100 | 100 | 100 | 100 |
| Zinc oxide | 3 | 3 | 3 | 3 | 3 |
| Santocure [1] | 1 | 1.5 | 1 | 1.5 | 1 |
| Sulfur | 1.75 | 2.5 | 1.75 | 2.5 | 1.75 |
| Flexamine [2] | 1 | 1 | 1 | 1 | 1 |
| Stearic acid | 1 | 1 | 1 | 1 | 1 |
| Boron nitride | 50 | 61 | | 122 | |
| P-33 | | | 50 | | 100 |

[1] N-cyclohexyl-2-benzothiazylsulfenamide.
[2] Physical mixture containing 65 percent of a complex diarylamine-ketone reaction product and 35 percent of N,N'-diphenyl-p-phenylenediamine.

The stocks were compounded, cured at 307° F., and physical properties determined. The following results were obtained:

TABLE IV

| | Samples | | | | |
|---|---|---|---|---|---|
| | 1 | 2 | 3 | 4 | 5 |
| Cure time at 307° F., min | 15 | 15 | 45 | 15 | 15 |
| Swell, V$_r$[1] | 0.350 | 0.472 | 0.392 | 0.478 | 0.401 |
| 300% Modulus, pounds per square inch | 810 | 880 | 460 | 1,230 | 790 |
| Tensile, pounds per square inch | 2,500 | 1,500 | 2,110 | 1,240 | 1,510 |
| Elongation, percent | 850 | 470 | 980 | 310 | 680 |
| NBS Abrasion Index [2] | 90 | 96 | 100 | 99 | 100 |

[1] In heptane; V$_r$ = volume fraction of polymer in swollen gel.
[2] Percent of control. A National Bureau of Standards Abrader was employed using #2½ garnet paper (ASTM D-394-47, adopted 1940, revised 1946, 1947). All samples were extracted 3 days with ethanol-toluene azeotrope and were then dried in vacuum for one week.

The quantities of reinforcing agents in samples 2 and 3 are approximately equal on a volume basis as are the quantities of reinforcing agents in samples 4 and 5.

The data of Tables III and IV show the similarity in reinforcing quality of boron nitride and of carbon black over a wide range of proportions.

*Example III*

A 75/25 butadiene/styrene rubber prepared by emulsion polymerization at 122° F., having a raw Mooney value (ML-4) of 48 and a bound styrene content of 23.5 percent, was compounded using boron nitride as a reinforcing agent. The following compounding recipe was employed:

| | Parts by weight |
|---|---|
| Rubber | 100 |
| Boron nitride | 61 |
| Zinc oxide | 3 |
| Santocure [1] | 1.2 |
| Sulfur | 2.5 |

[1] N-cyclohexyl-2-benzothiazylsulfenamide.

The stock was milled, cured 15 minutes at 307° F., and physical properties determined. Results were as follows:

| | |
|---|---|
| Swell, V$_r$[1] | 0.453 |
| 300% modulus, pounds per square inch | 730 |
| Tensile, pounds per square inch | 1650 |
| Elongation, percent | 580 |

[1] In heptane; V$_r$ = volume fraction of polymer in swollen gel.

Example III shows the applicability of this invention to the products of emulsion polymerization at elevated temperatures.

The boron nitride reinforced rubber stocks produced an attractive, white product. The physical properties which compare favorably with soft carbon black filled stocks as shown by the above data were most satisfactory and quite unexpected.

I claim:

1. A composition of matter comprising an elastomer selected from the group consisting of natural rubber, homopolymers of conjugated dienes having from 4 to 8 carbon atoms per molecule and copolymers of such conjugated dienes with copolymerizable monomers containing a $CH_2$=C< group, said elastomer being sulfur vulcanizable in its uncured state, and from 5 to 150 parts by weight of boron nitride per 100 parts of elastomer.

2. A composition according to claim 1 wherein said elastomer is natural rubber.

3. A composition according to claim 1 wherein said elastomer is a polymer of a monomer system comprising butadiene in a major amount.

4. A composition of matter comprising an elastomer selected from the group consisting of natural rubber, homopolymers of conjugated dienes having from 4 to 8 carbon atoms per molecule and copolymers of such conjugated dienes with copolymerizable monomers containing a $CH_2$=C< group, said elastomer being sulfur vulcanizable in its uncured state, from 5 to 150 parts by weight of boron nitride per 100 parts of elastomer, and at least one material selected from the group consisting of carbon black, clay, silica, kaolin, calcium silicate, titanium dioxide, hydrated alumina, calcined magnesia, calcium carbonate, zinc sulfide, and zinc oxide.

5. A composition of matter comprising a rubbery copolymer of butadiene and styrene and from 5 to 150 parts by weight of boron nitride per 100 parts of copolymer.

6. A method of reinforcing a sulfur vulcanizable elastomer selected from the group consisting of natural rubber, homopolymers of conjugated dienes having from 4 to 8 carbon atoms per molecule and copolymers of such conjugated dienes with copolymerizable monomers containing a $CH_2$=C< group which comprises incorporating into 100 parts by weight of said elastomer from 5 to 150 parts by weight of boron nitride.

7. A process according to claim 6 which comprises forming an aqueous slurry of boron nitride, blending said slurry with a latex of said vulcanizable elastomer, and thereafter coagulating said latex.

8. A process according to claim 6 wherein said boron nitride is compounded with said elastomer by blending said boron nitride with the coagulum of said elastomer.

References Cited in the file of this patent
UNITED STATES PATENTS

| | | |
|---|---|---|
| 2,105,363 | Nowak et al. | Jan. 11, 1938 |
| 2,152,536 | Cooper | Mar. 28, 1939 |

OTHER REFERENCES

Fisher: "Nomenclature of Synthetic Rubbers," Industrial and Engineering Chemistry, August 1939, page 942.